June 6, 1967 W. H. BRUNS ET AL 3,323,606
ELEVATOR LOAD WEIGHING APPARATUS
Filed Jan. 6, 1965 4 Sheets-Sheet 1

INVENTORS
WILLIAM HENRY BRUNS
HENRY AUGUST STAINKEN

BY *W. L. Hunter* ATTORNEY

June 6, 1967     W. H. BRUNS ET AL     3,323,606
ELEVATOR LOAD WEIGHING APPARATUS Filed Jan. 6, 1965     4 Sheets-Sheet 4

INVENTORS
WILLIAM HENRY BRUNS
HENRY AUGUST STAINKEN

BY *W. L. Hunter* ATTORNEY

United States Patent Office 3,323,606
Patented June 6, 1967

3,323,606
ELEVATOR LOAD WEIGHING APPARATUS
William Henry Bruns, Lincolndale, and Henry August Stainken, Staten Island, N.Y., assignors to Otis Elevator Company, New York, N.Y., a corporation of New Jersey
Filed Jan. 6, 1965, Ser. No. 423,667
20 Claims. (Cl. 177—147)

This invention relates to apparatus for weighing the load in an elevator car.

The weighing of the load in an elevator car serves a number of useful purposes. An overloaded car can be detected and a signal generated to indicate this condition and/or prevent starting of the car. The dispatcher, or the electronic dispatching system, can be advised of the load in each car. The hoisting motor can be controlled in accordance with the load on the system to provide uniform starting, running and stopping operations. In the case of elevators operated without attendants, the system can be controlled so that a fully loaded car bypasses hall calls. For these and other reasons, modern elevator systems usually include some form of load weighing apparatus.

Many load weighing arrangements have been used in the past. One of the most common is the so called platform weighing. The cab is mounted resiliently with respect to the car frame by springs or rubber bushings and, accordingly, deflects as passengers enter. The deflection of the floor with respect to the frame is detected by some sort of transducer, usually a bank of micro switches located beneath the floor, which are actuated successively as the load is increased. This arrangement has a number of disadvantages. The entire platform must move an appreciable distance and the necessary supports introduce friction which limits the sensitivity obtainable. The location of the switches is inconvenient for adjustment and servicing. The bank of switches, or other transducer, is located at one spot, usually beneath the middle of the platform, and accordingly the weight indicated will vary somewhat with the location of the load on the platform. This variation is especially noticeable with concentrated loads on a large platform. Also, when rubber bushings are used, there is a considerable time delay from the time passengers leave the car until the bushings restore the platform to its normal position so that it is possible for the arrangement to indicate a load when actually none is present. Additionally, a large number of conductors are required between the car and the controller in the machine room.

Crosshead weighing has also been proposed. In this arrangement the hoist ropes are fastened to the car through a resilient connection and the displacement between the ropes and the car is measured by a bank of switches or other transducer. This arrangement has the additional disadvantage that, although the weight of the hoist ropes is compensated for by standard compensating ropes from the bottom of the car to the counterweight, the measurement changes with car position even though the load on the system does not change. This is due to the introduction or removal of the weight of compensating ropes hanging from the bottom of the car.

It is a general object of the present invention to provide an improved apparatus for weighing the load in an elevator car.

Another object is to provide a weighing apparatus in which the measurement is independent of the car position.

Another object is to provide a weighing system which requires no conductors between the car and the controller.

Another object is to provide a weighing apparatus in which the measurement is independent of the position of the load within the car.

Another object is to provide a weighing apparatus in which the measurement is not affected by variations in the tension in the compensating ropes.

Another object is to provide a weighing system which requires but a small amount of mechanical movement.

Another object is to provide a weighing system which is readily accessible for servicing.

Another object is to provide a weighing system which responds quickly to changes in the load.

In accordance with one embodiment of the invention, the bed plate, on which the motor and traction sheaves are mounted, is supported for limited rotation about a horizontal axis. The axis is located between the ropes supporting the car and those supporting the counterweight so that the entire bed plate rotates slightly as the car is loaded. In general, any suitably transducer may be used to detect the motion of the bed plate and generate a signal which can then be used for any desired purpose. More particularly, the invention contemplates a magnetostrictive transducer which both limits the motion of the bed plate to a slight amount and generates a signal indicative of the resulting slight motion. By this arrangement the load on the system is measured independently of car position. Additionally, all of the weighing apparatus is located conveniently in the machine rom and no conductors between car and machine room are required.

For a clearer understanding of the invention, reference may be made to the following detailed description and the accompanying drawing, in which.

Figure 1:
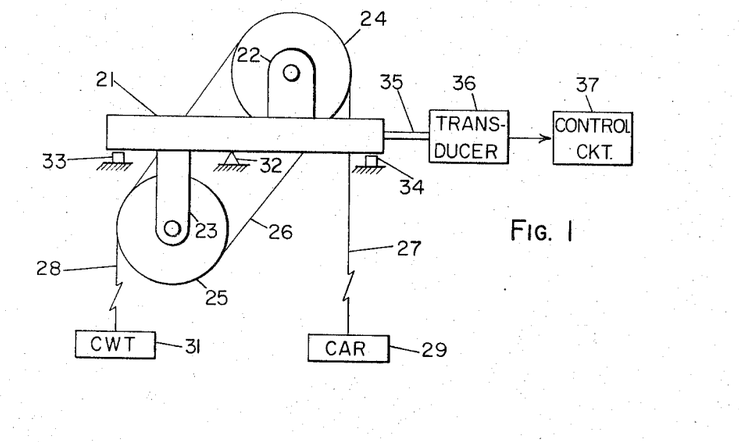
FIGURE 1 is a schematic diagram illustrating the principles of the invention.

Referring first to FIGURE 1, there is shown schematically a portion of an elevator system including a bed plate 21 assumed to be located in the penthouse. Brackets 22 and 23 are fastened to the bed plate 21 and support a main driving sheave 24 and a deflector, or secondary, sheave 25 respectively. The driving sheave 24 is assumed to be driven by a suitable motor, not shown in FIGURE 1. Hoist ropes 26 pass over the sheaves 24 and 25 and opposite runs or drops 27 and 28 are connected to an elevator car 29 and a counterweight 31 respectively. The bed plate 21, instead of being rigidly fastened to the building structure, is mounted for limited rotation about a fulcrum 32. Rotation is limited by suitable stops, schematically shown at 33 and 34. It is apparent that the tendency of the bed plate to rotate is a function of the load in the car 29. An arm 35 connects the bed plate 21 to a transducer 36 which generates a signal indicative of the load in the car 29. This signal is passed to a control circuit 37 which may indicate the load condition and/or control the operation of the elevator system. For example, the circuit 37 may indicate that the car is empty, that it is loaded to capacity, or that it is overloaded. The circuit 37 may control the elevator system to dispatch the car 29 as soon as it is fully loaded to bypass hall calls when fully loaded, or to control the hoist motor in accordance with the load.

The fulcrum 32 may be located at any position under the bed plate 21 which would cause the rotational tendency of the bed plate 21 to vary with the load in the car 29. The fulcrum could be placed at either the right or the left end of the bed plate, as viewed in FIGURE 1, or anywhere in between except in alignment with the rope drop 27. The fulcrum could be located at right angles to the position shown, perpendicular to the axis of the sheave 24, provided it were displaced from the rope drop 27. However, it is preferred at present that the fulcrum 32 be positioned substantially horizontally, parallel to to the axis of the sheave 24, and midway between the rope drops 27 and 28, as will be more fully discussed.

The transducer 36 may be any of several kinds, such as a bank of micro switches, a differential transformer, a carbon pile the resistance of which engages with pressure, or a piezo electric device. However, it is preferred at present to use a magnetostrictive device, as will be more fully explained.

FIGURE 1 illustrates a system with the machine installed above and using double wrap roping in which the secondary sheave is mounted on the bed plate. It is apparent that the principles of the invention are also applicable to a single wrap roping arrangement. The principles are also applicable to some systems in which the secondary sheave is mounted on the building structure, also to some systems in which no secondary sheave is used, and even to systems in which the machine is installed below.

Figures 2, 6:
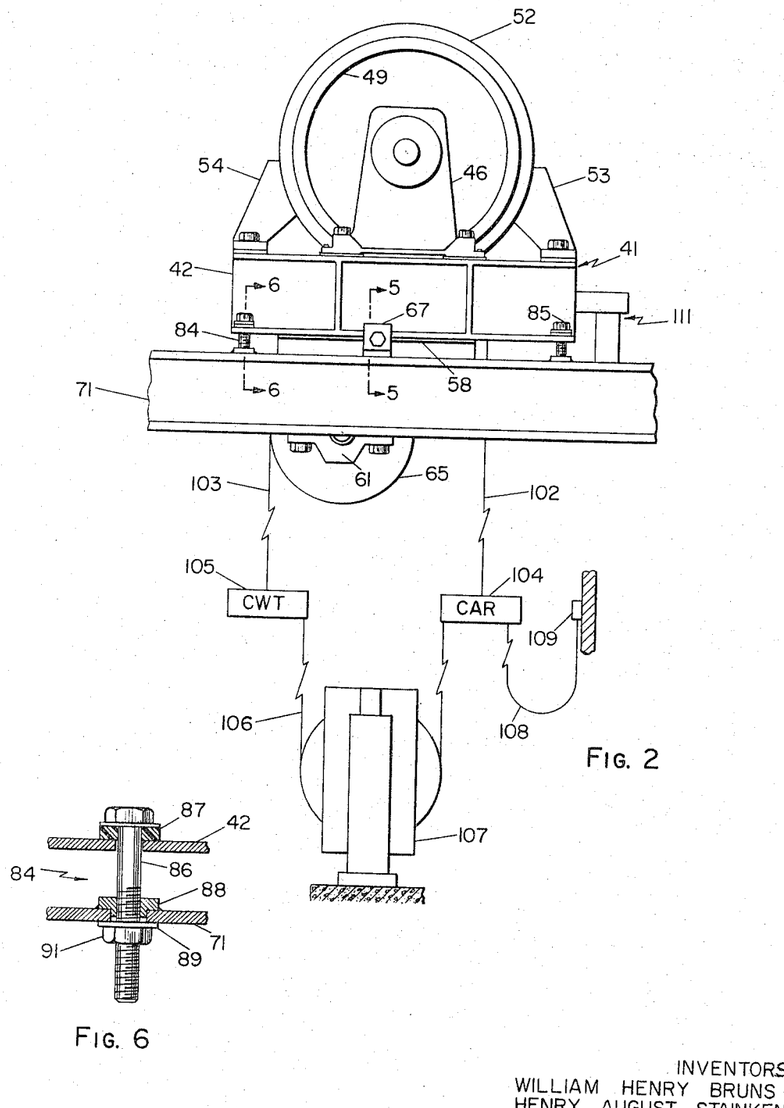
FIGURE 2 is an elevation view, partly schematic, of an elevator machine incorporating the invention.
FIGURE 6 is a detail view in section, taken on the line 6—6 of FIGURE 2.
Figure 3:
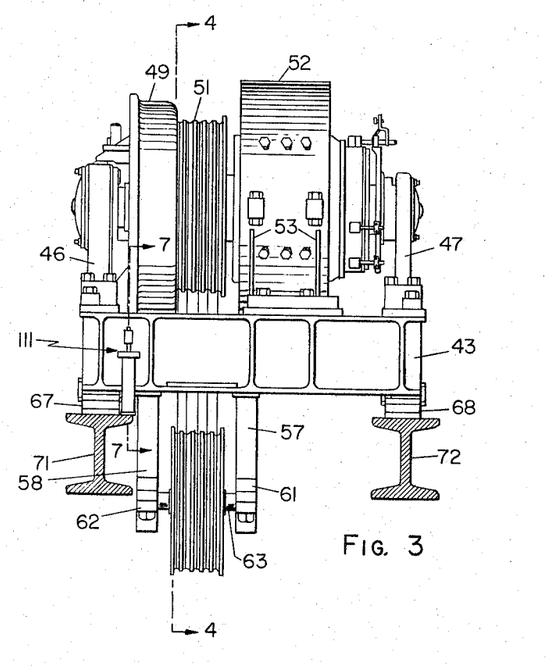
FIGURE 3 is a side elevation view of the same machine.
Figure 4:
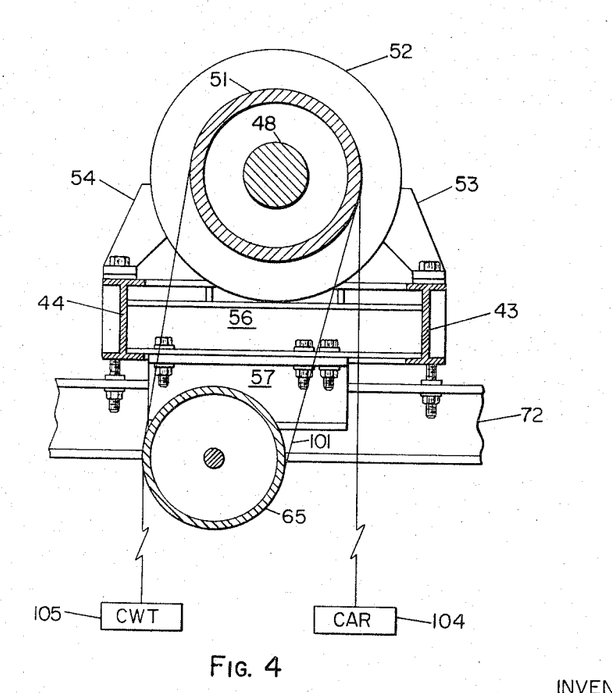
FIGURE 4 is a cross section view taken on the line 4—4 of FIGURE 3.

Referring next to FIGURES 2, 3 and 4, a bed plate, denoted generally by the reference character 41, includes four I beams 42, 43, 44 and 45, arranged in a rectangle and fastened together. Brackets 46 and 47 support the main shaft 48 to which are fastened a brake drum 49, the main sheave 51, and the rotor of an electric motor 52. The stator of the motor 52 is mounted on the beams 43 and 44 by means of brackets 53 and 54. A pair of I beams, one of which is shown at 56 in FIGURE 4, extend between and are supported by the beams 43 and 44. These beams in turn support depending beams 57 and 58 which carry bearings 61 and 62 in which rotates a shaft 63 carrying the secondary sheave 65.

Figure 5:
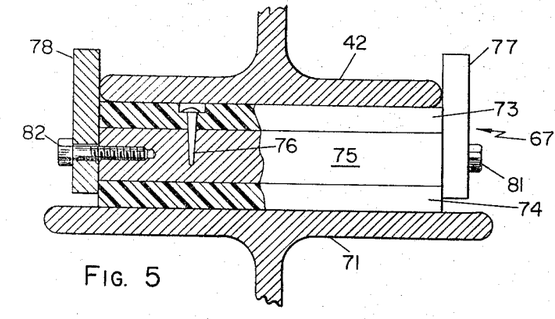
FIGURE 5 is a detail view, partly in elevation and partly in section, taken on the line 5—5 of FIGURE 2.

The bed plate 41 is supported by two flexible blocks 67 and 68, the upper surfaces of which support I beams 42 and 45 and the lower surfaces of which rest on two I beams 71 and 72 which are part of the framework of the building. As shown in FIGURE 5, each block comprises two sheets or slabs 73 and 74 of a resilient material with a metal plate 75 interposed between them. The slabs 73 and 74 are both fastened to the plate 75 by cementing or by pins, such as the pin 76, driven into holes in the plate 75. Although the dimensions are not critical, in one embodiment the slabs 73 and 74 were each one half inch thick while the plate 75 was one inch thick. All three were about three inches wide and their lengths were approximately equal to the width of the flange of the I beam 42 which was about six and one half inches. Two upstanding brackets 77 and 78 are fastened by bolts 81 and 82 to the plate 75 and embrace the flange of the beam 42 to prevent creeping of the block when installed. The slabs 73 and 74 are preferably made of polyurethane because such material can withstand high compressional stresses, is quiet when flexed, and is highly resistant to corrosion.

The two blocks 67 and 68 are aligned with each other and constitute a fulcrum about which the bed plate 41 tends to rotate as the load in the car changes. Rotation is limited primarily by the transducer, as will be more fully explained, but is further limited and creepage prevented, by four fasteners, one in each corner of the bed plate 41, two of which, the fasteners 84 and 85, are shown in FIGURE 2. Fastener 84 is typical and, as best shown in FIGURE 6, comprises a bolt 86 which passes through apertures in the I beams 42 and 71. A resilient washer 87 such as polyurethane is placed under the head of the bolt 86 and a threaded bushing 88 is positioned in the aperture of the beam 71 and welded thereto. A washer 89 and a lock nut 91 hold the fastener in place. However, the bolt 86, and the three other corresponding bolts, are drawn up only *finger tight* in order to allow the bed plate 41 to rotate slightly about the blocks 67 and 68 and to transmit the rotational forces to the transducer. The four fasteners (such as the fasteners 84 and 85) do, however, prevent the bed plate 41 from creeping and would hold it in place in case of failure of the transducer.

The hoist ropes 101 pass over the sheaves 51 and 65 and, as best shown in FIGURE 2, the portions thereof constituting rope drops 102 and 103 are fastened to the car 104 and counterweight 105 respectively. Compensating ropes 106 hang from the car 104 and counterweight 105 and pass around a tensioning sheave assembly 107 located in the pit. The assembly 107, shown schematically in FIGURE 2, may be any of several well known kinds in which the sheave is urged downwardly by a weight or by springs while upward movement is prevented, or limited to a small amount, thereby maintaining tension in the ropes 106. Traveling cables 108 have one end fastened to the underside of the car 104 while the other end is connected to a junction box 109 fastened to the hoistway wall. The intermediate portion hangs in a loop as shown.

The weight of the compensating ropes is selected in accordance with well known principles with due regard for the weight of the hoist ropes and the traveling cables so that the net load on the rope drops 102 and 103 (that is, the difference in load on the two rope drops) is independent of the position of the car in the hoistway. Since the fulcrum (the blocks 67 and 68) is located midway between the rope drops 102 and 103, the sum of the moments tending to rotate the bed plate 41 is also independent of car position.

Another important reason for placing the fulcrum midway between the rope drops concerns the tension in the hoist and compensating ropes. As the ropes stretch and contract, the tension imposed by the tensioning sheave assembly 107 varies. If the fulcrum were located anywhere else, such variations in tension would cause variations in the tendency of the bed plate to rotate. However, the tension imposed by the assembly 107 is transmitted equally to the rope drops 102 and 103 and since these are equidistant from and on opposite sides of the fulcrum, the moments due to tension are equal and opposite. Thus the rotational tendency of the bed plate 41 is independent of rope tension.

The moments tending to rotate the bed plate 41 are independent of car position and rope tension but do, however, vary with the load in the car. Thus, a measure of these moments (the rotational tendency of the bed plate 41) is a measure of the weight in the car. In the specific embodiment illustrated, the center of gravity of the system is such that the moments tend to rotate the bed plate 41 clockwise, as viewed in FIGURE 2, at all times, even when the car 104 is empty.

The transducer, indicated generally by the reference character 111, is positioned near one corner of the bed plate 41, as shown in FIGURES 2 and 3, directly above one of the building beams 71. As previously mentioned it is preferred at present to use a magnetostrictive transducer.

The magnetostrictive properties of certain materials such as nickel are well known and have been described in the literature. See, for example, an article entitled "Stress Measurement by Magnetostriction," by F. D. Smith and C. A. Luxford, Proceedings of the Institute of Mechanical Engineers, volume 143, pages 56–59 (1940). For present purposes, it is sufficient to note a few properties. If a transformer be constructed using a nickel rod as a core and if the primary be excited with alternating current, the output voltage of the secondary varies with the stress in the rod. A variation of stress in tension produces a more nearly linear variation in output voltage over a wider range than does a similar variation in compressional stress. As the tension increases, the output voltage decreases.

Figures 7, 9, 10:
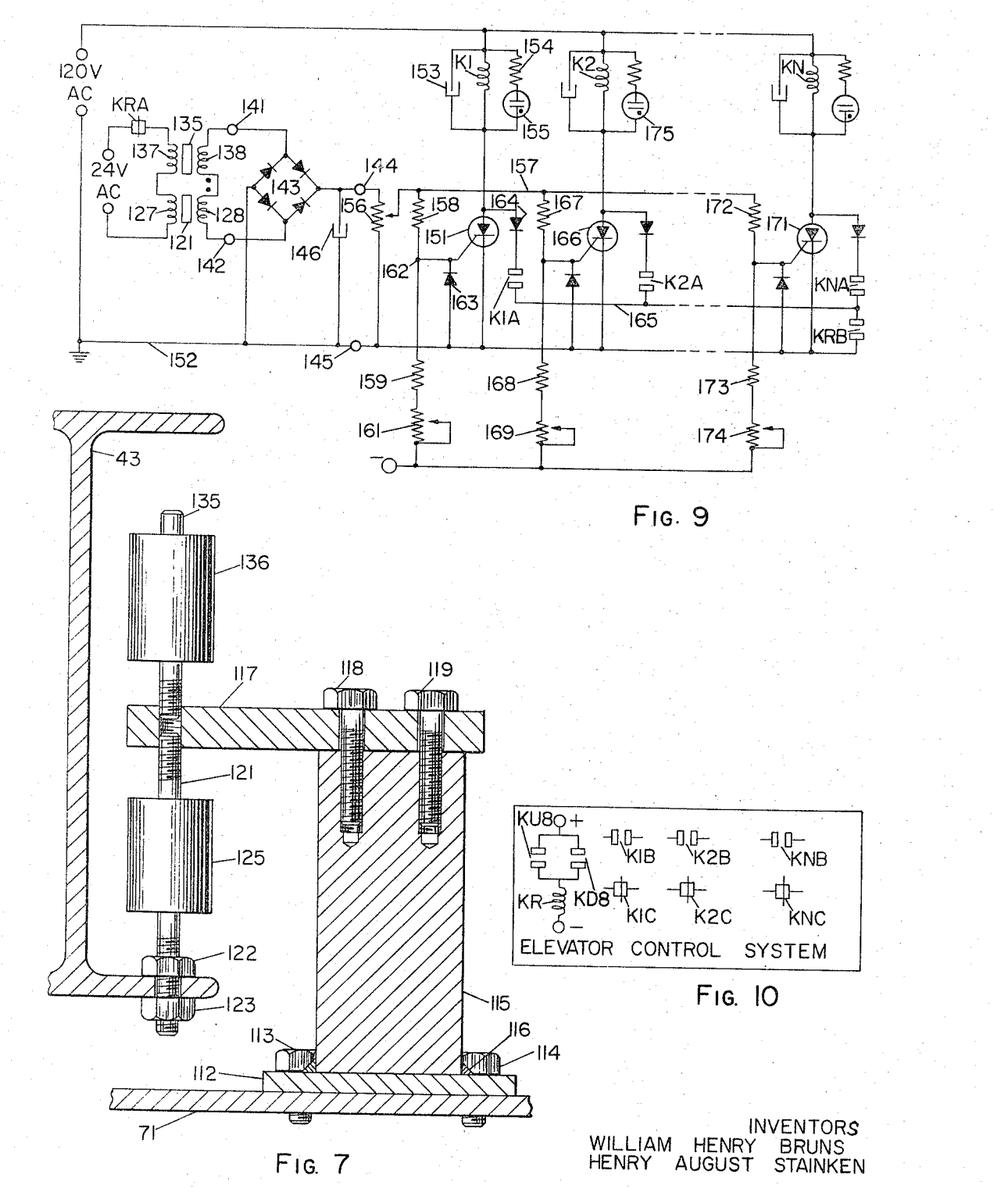
FIGURE 7 is an enlarged cross section view of the transducer, taken on the line 7—7 of FIGURE 3.
FIGURE 9 is a schematic diagram of the electrical circuit.
FIGURE 10 is a schematic view of a portion of a control system.

Variations in the tension of a magnetostrictive element are utilized in the specific embodiment of the invention now being described. As best shown in FIGURE 7, a metal plate 112 is fastened by bolts 113, 114 to the top of the building I beam 71. A rigid metal post 115 is fastened to the plate, for example, by welding as shown at 116. A rigid arm 117 is fastened to the top of the post 115 by bolts 118, 119, and the end projects between the flanges of the bed plate I beam 43. An annealed nickel rod 121 is threaded at the top into a tapped aperture in the arm 117. The lower end of the rod 121 is also threaded and passes through an aperture in the lower flange of the beam 43. Nuts 122 and 123 above and below the flange hold the rod 121 in place. Preferably the nut 123 is drawn up to subject the rod 121 to a small amount of tension when the car 104 is empty whereupon the nut 122 is tightened to hold the rod in this position. It is apparent that the rod 121 is under tension at all times because any load in the car 104 increases the tension. It is also apparent that the rod 121 limits the movement of the bed plate 41 to the difference in the elongation of the rod 121 between that caused by the empty and full car conditions. This is a very small amount and is imperceptible to the naked eye.

Figure 8:
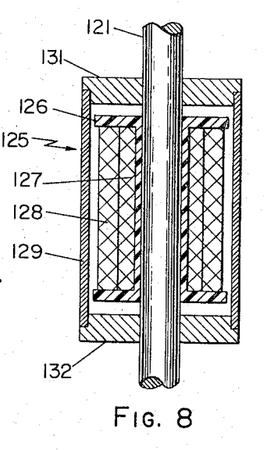
FIGURE 8 is an enlarged cross section view of the transformer shown in FIGURE 7.

The stress in the rod 121, and therefore the load in the car 104, is measured with the air of a transformer 125 surrounding the rod 121. As shown in FIGURE 8, an insulating spool 126 tightly surrounds the rod 121 and supports primary and secondary windings 127 and 128, shown conventionally by the double cross hatching. The spool and windings are surrounded by a cylindrical shell 129 of magnetic material, the open ends of which are closed by end caps 131 and 132, also of magnetic material. The end caps 131 and 132 tightly engage both the shell 129 and the rod 121 so that there is formed a transformer with a closed magnetic circuit having the rod 121 as a portion of its core.

When the primary winding 127 is excited with alternating current, a voltage is induced in the secondary winding 128. As the load in the car 104 is increased from zero to full load, the induced voltage decreases approximately linearly. This voltage which decreases with load could be utilized by a suitable control circuit but it is more convenient to have a voltage which increases with load. Accordingly, a second annealed nickel rod 135 is provided with a second transformer 136 identical to the transformer 125. The rod 135 is not stressed and may be positioned, with its transformer 136, almost anywhere. For convenience the end of the rod 135 is threaded and screwed into the top of the arm 117 as shown.

As shown in FIGURE 9, the primary windings 127 and 137 of the two transformers 126 and 136 are connected in series to a source of alternating current through the normally closed contacts KRA the purpose of which will be described subsequently. The secondary windings 128 and 138 are connected in series opposing and their combined output is connected to the terminals 141 and 142. If the transformers were identical and there were no stress on either rod, the voltage output would be zero. However, the rod 121 is in tension, even when the car is empty, and the voltage of winding 128 is less than that of the winding 138 so that there is an output voltage at the terminals 141 and 142. As the load in the car 104 increases, the tension in the rod 121 increases, the voltage induced in the winding 128 decreases while the voltage induced in the winding 138 remains the same, and the output voltage at terminals 141 and 142 increases. Thus the present arrangement provides a voltage which increases with load.

The use of two transformers with the secondaries connected in opposition has a further advantage. The voltage induced in each secondary varies with temperature, but because both transformers are subjected to the same ambient temperature and carry the same currents, voltage variations due to temperature changes substantially cancel each other.

The terminals 141 and 142 carry an alternating voltage the magnitude of which varies continuously (and substantially linearly) with the load. Some elevator systems may utilize this alternating voltage directly but it is frequently more convenient to have a unidirectional voltage. Accordingly the terminals 141 and 142 are connected to the input of a full wave bridge rectifier 143, the output of which is connected to the terminals 144 and 145 which are shunted by a capacitor 146 to smooth out high frequency variations in magnitude. The unidirectional voltage at terminals 144 and 145 also varies continuously with load and in some cases may be utilized directly to control the elevator system. In other cases a step control is more convenient. The remainder of the circuit of FIGURE 9 senses various predetermined levels of the voltage at terminals 144 and 145 and generates a signal as each level is reached. Accordingly, this portion of the circuit may be regarded as an analog to digital converter. In FIGURE 9, the signals generated are in the form of discrete changes in voltage and current and are utilized to operate relays and indicator lamps.

A silicon controlled rectifier 151 has its cathode connected to a ground conductor 152 and its anode connected through the operating winding of relay K1 to one terminal of a source of alternating current the other terminal of which is grounded. Shunted across the winding K1 is a capacitor 153 and also the series combination of a resistor 154 and a neon lamp 155. A potentiometer 156 has its extremities connected across the terminals 144 and 145, the latter of which is grounded, while its wiper arm is connected to a conductor 157. A voltage divider comprising fixed resistors 158 and 159 and an adjustable resistor 161 are serially connected in that order between the conductor 157 and a source of negative potential. The junction 162 of the resistors 158 and 159 is connected to the gate electrode of the silicon controlled rectifier 151. A diode 163 has its cathode connected to the junction 162 and its anode grounded to prevent the gate from going appreciably negative with respect to the cathode of the controlled rectifier 151. A diode 164 has its anode connected to the anode of the controlled rectifier 151 and its cathode connected through the normally open contacts K1A (operated by the relay winding K1) to a conductor 165 for a purpose which will be discussed subsequently.

A second silicon controlled rectifier 166 and a relay K2 are connected to the alternating current supply, the conductors 157 and 152, and the negative source by circuitry similar to that described for the controlled rectifier 151 and relay K1. This circuitry includes a voltage divider comprising resistors 167, 168 and 169. As many additional similar circuits as desired may be included. The final circuit is illustrated as comprising, in part, the silicon controlled rectifier 171, the relay KN and the resistors 172, 173 and 174.

In operation, the potentiometer 156 is adjusted to set the potential of the conductor 157 at a predetermined level under a selected condition, such as with the elevator car empty. Current flows from the conductor 157 through the resistors 158, 159 and 161 to the negative source. The values of these resistors are selected and adjusted to make the potential of the junction 162 such as to cause the rectifier 151 to become conductive when a predetermined load is in the elevator car. When the rectifier 151 becomes conductive, current flows therethrough during each half cycle of the alternating current source and the relay K1 is operated. The capacitor 153 smooths the pulsating direct current and prevents the relay from chattering. The voltage drop across the winding K1 illuminates the lamp 155. The remaining voltage dividers are selected and adjusted to make each successive controlled rectifier, such as the rectifiers 166 and 171, conductive for successively larger predetermined loads in the elevator car.

It is convenient to make all of the resistors 159, 168–173 equal, and to make the total value of each of the resistors 161, 169–174 equal, but to make the resistors 158, 167–172 of successively higher values. Thus successively higher voltages of the conductor 157 (corresponding to successively greater loads on the elevator car) are required to operate the relays K1, K2 . . . KN. Final adjustment may be made by adjusting the variable resistors 161, 169–174. The potentiometer 156 may be used to adjust all operating points upward or downward simultaneously.

It is convenient to select and adjust the circuit parameters so that the potential of the junction 162 is just sufficient to cause the rectifier 151 to be conductive when the elevator car is empty. Thus, normally the relay K1 is energized and the lamp 155 is illuminated at all times. This arrangement provides a service man with a quick check of whether the system is operating properly. When the car is empty, the lamp 155, and only the lamp 155, should be illuminated. He may make a further quick check by grasping the corner of the bed plate and pulling upward. If the system is operating properly, the upward pressure will relieve the tension on the rod 121 sufficiently to extinguish the lamp 155. Additionally, if the circuit is initially adjusted to make the controlled rectifier 166 conductive with but a single person in the car, the service man can make another quick check by pushing downward or stepping on the corner of the bed plate which should illuminate the lamp 175.

FIGURE 10 shows schematically a few elements of an elevator control system including, for illustrative purposes, both normally closed and normally open contacts K1B, K1C, K2B, K2C, KNB and KNC, operated by the relays K1, K2 and KN. These contacts may be connected in a well known manner to control the elevator system in accordance with load. For example, as previously mentioned, these contacts can be used to dispatch a full car, to bypass hall calls when the car is full, and to control the energization of the hoist motor. Also shown is the operating winding of a relay KR which is energized when and only when the elevator car is running. The winding KR may be connected in various ways, one satisfactory arrangement being shown in FIGURE 10 wherein the winding KR is energized when and only when one of the auxiliary contacts KU8 or KD8 of the main up and down relays KU or KD (not shown are closed.

The tendency of the bed plate 41 to rotate, and the tension on the rod 121, both vary not only with changes in the static load in the car but also with dynamic load variations due to acceleration and deceleration. The present invention can be used to measure these dynamic loads and to control the elevator accordingly, but to make the apparatus compatible with the majority of present control systems, it is at present preferred to weigh the load while the car is at a landing and to remember the load so weighed while the car is running. As shown in FIGURE 9, the previously mentioned normally closed contact KRA (operated by the relay KR) is inserted in the line between the alternating current source and the primary windings 127 and 137 while the normally open contacts KRB are connected between the conductor 165 and the ground conductor 152. When the car is at a landing, the contact KRA is closed, the contact KRB is open, and the circuit operates as previously explained, with the load in the car determining which of the relays K1, K2 . . . KN are energized. For example, suppose that the load is sufficient to render the controlled rectifiers 151 and 166 conductive but insufficient to render the rectifier 171 conductive. The relays K1 and K2 are then energized, closing contacts K1A and K2A. Closure of these contacts has no effect at this time since the contact KRB is open. When the car moves the relay winding KR is energized and the contact KRB closes completing a circuit, independent of the rectifier 151, for the relay K1 through the diode 164, contact K1A, and the contact KRB to ground, and completing a similar circuit for the relay K2. The relay KN remains deenergized since the contact KNA is open. At the same time, the contact KRA closes removing the positive voltage from the terminal 144 and the conductor 157. Current flows from ground through the diode 163, the resistor 159 and the resistor 161 to the negative source, biasing the gate electrode of the rectifier 151 slightly negative (by the amount of the voltage drop in the diode 163) thereby rendering the rectifier 151 non-conductive. Similarly, all of the controlled rectifiers are rendered non-conductive. But the relays K1 and K2 remain energized while the relay KN remains deenergized. Thus the circuit stores the signals and "remembers" the load in the car as it was just before it started to move and the elevator system can be controlled accordingly. When the car next stops, the relay KR is deenergized, the contact KRB opens breaking the holding circuits for the relays K1 and K2, and the contact KRA closes re-establishing the voltage on the conductor 157 thereby again allowing the load on the car to determine which of the controlled rectifiers are rendered conductive.

From the foregoing it is apparent that the present invention provides an improved load weighing arrangement. When the fulcrum is located midway between the rope drops, as illustrated, and when the usual proper compensating ropes are provided, the measurement is independent of car position and the tension in the compensating ropes. All of the apparatus is located in the machine room and therefore is readily accessible for servicing. No conductors between the car and machine room are required. The system responds quickly to changes in load. The apparatus is adequately sensitive to detect the load due to a single person in the car.

Although a specific embodiment of the invention has been described in considerable detail for illustrative purposes, many modifications can be made without departing from the invention. For example, the nickel rod 121 could be mounted on the left, instead of the right, side of the bed plate, as viewed in FIGURE 2, provided the mounting were arranged to subject the rod to tension. Also, some elevator machines may have their center of gravity so located with respect to the fulcrum that the tendency of the bed plate to rotate decreases as the load in the car increases. In such cases it may be preferred to omit the second rod and transformer and use directly the voltage from the first which increases with load. Additionally, other kinds of analog to digital converters can be used or, as previously mentioned, in some cases the analog voltages can be used directly. Many other modifications will occur to those skilled in the art. It is therefore desired that the protection afforded by Letters Patent be limited only by the true scope of the appended claims.

What is claimed is:
1. A load weighing system, comprising,
an elevator car,
a bed plate,
sheave means mounted on said bed plate,
a hoist rope fastened to said car and engaging the periphery of said sheave means,
means for mounting said bed plate for limited rotation, whereby variations in the load in said car vary the tendency of said bed plate to rotate, and
means for generating a signal indicative of the tendency of said bed plate to rotate.

2. A load weighing system, comprising,
an elevator car,
a bed plate,
sheave means mounted on said bed plate, a hoist rope fastened to said car and engaging the periphery of said sheave means, a motor mounted on said bed plate and operatively connected to said sheave means for raising and lowering said car, means for mounting said bed plate for limited rotation, whereby variations in the load in said car vary the tendency of said bed plate to rotate, and means for generating a signal indicative of the tendency of said bed plate to rotate.

3. A load weighing system, comprising, an elevator car,
a counterweight,
a bed plate,
sheave means rotatably mounted on said bed plate,
a hoist rope having opposite ends fastened to said car and said counterweight and engaging the periphery of said sheave means,
means for mounting said bed plate for limited rotation, whereby variations in the load in said car vary the tendency of said bed plate to rotate, and
means responsive to the rotational tendency of said bed plate for generating a signal indicative thereof.

4. A load weighing system, comprising, an elevator car,
a counterweight,
a bed plate,
sheave means rotatably mounted on said bed plate,
a hoist rope having opposite ends fastened to said car and said counterweight and passing over said sheave means,
a motor mounted on said bed plate and operatively connected to said sheave means for raising and lowering said car,
means for mounting said bed plate for limited rotation whereby variations in the load in said car vary the tendency of said bed plate to rotate, and
means for generating a signal indicative of the tendency of said bed plate to rotate.

5. A load weighing system, comprising, an elevator car,
a counterweight,
a bed plate,
sheave means rotatably mounted on said bed plate,
a hoist rope having opposite ends fastened to said car and said counterweight and engaging the periphery of said sheave means,
pivot means for mounting said bed plate for limited rotation,
said pivot means being displaced from the portion of said hoist rope running between said sheave means and said car, whereby variations of the load in said car vary the tendency of said bed plate to rotate, and
means for generating a signal indicative of the tendency of said bed plate to rotate.

6. A load weighing system, comprising, an elevator car,
a counterweight,
a bed plate,
sheave means rotatably mounted on said bed plate,
a hoist rope having opposite ends fastened to said car and said counterweight and engaging the periphery of said sheave means,
pivot means for mounting said bed plate for rotation about a substantially horizontal axis,
said axis being located midway between the vertical running portions of said hoist rope which directly support said car and said counterweight, and
means for generating a signal indicative of the rotation of said bed plate.

7. Load weighing apparatus, comprising, an elevator car,
a counterweight,
a bed plate,
traction sheave means rotatably mounted on said bed plate, a hoist rope passing over and engaging said traction sheave means and having opposite ends connected to said car and said counterweight,
a compensating rope hanging beneath and having opposite ends connected to said car and said counterweight,
tension sheave means mounted below the lower limit of travel of said car and counterweight and engaging said compensating rope for maintaining tension therein,
means for mounting said bed plate for limited rotation about a substantially horizontal axis,
said axis being located midway between the vertical portions of said hoist rope which support said car and said counterweight, whereby the rotational tendency of said bed plate is independent of the tension in said compensating rope, and,
means responsive to the tendency of said bed plate to rotate for generating a signal indicative thereof, 8. A load weighing system, comprising, an elevator car,
a counterweight,
a bed plate,
a traction sheave mounted on said bed plate for rotation about a substantially horizontal axis,
a secondary sheave rotatably mounted on said bed plate with its axis parallel to but laterally displaced from said axis of said traction sheave,
a hoist rope engaging both of said sheaves and having opposite ends fastened to said car and said counterweight,
pivot means for mounting said bed plate for limited rotation about an axis substantially parallel to said axes of said sheaves,
said axis of said pivot means being displaced from the vertical running portion of said hoist rope which supports said car, whereby variations in the load in said car vary the tendency of said bed plate to rotate, and
means for generating a signal indicative of the tendency of said bed plate to rotate.

9. A load weighing system, comprising, an elevator car,
a counterweight,
a bed plate positioned above said car and said counterweight,
a traction sheave mounted on said bed plate for rotation about a substantially horizontal axis,
a secondary sheave rotatably mounted on said bed plate with its axis parallel to but laterally displaced from said axis of said traction sheave,
a hoist rope passing over both of said sheaves and fastened at opposite ends to said car and said counterweight,
a compensating rope depending from and interconnecting said car and said counterweight,
pivot means for mounting said bed plate for limited rotation about an axis substantially parallel to said axes of said sheaves,
said axis of said pivot means being located midway between the vertical running portions of said hoist rope which directly support said car and said counterweight, whereby the moments tending to rotate said bed plate are independent of the position of said car but vary with the load in said car, and
means responsive to the rotational tendency of said bed plate for generating a signal indicative thereof.

10. An elevator system, comprising, an elevator car,
a counterweight,
a bed plate,
sheave means mounted on said bed plate,
a hoist rope passing over said sheave means and having opposite ends fastened to said car and said counterweight, pivot means for mounting said bed plate for limited rotation, whereby variations of the load in said car vary the tendency of said bed plate to rotate, said pivot means comprising a pair of blocks of a polyurethane material interposed between said bed plate and the building structure, and a transducer acting between the building structure and said bed plate for generating a signal indicative of the rotational tendency of said bed plate.

11. A load weighing system, comprising, an elevator car, a counterweight, a bed plate, sheave means mounted on said bed plate, a hoist rope engaging said sheave means and having opposite ends fastened to said car and said counterweight, means for mounting said bed plate for limited rotation, whereby the tendency of said bed plate to rotate is a measure of the load in said car, and a magnetostrictive transducer for generating a signal indicative of the rotational tendency of said bed plate.

12. A load weighing system, comprising, an elevator car, a counterweight, a bed plate sheave means mounted on said bed plate, a hoist rope engaging said sheave means and having opposite ends connected to said car and said counterweight, means for mounting said bed plate for limited rotation whereby variations of the load in said car vary the rotational tendency of said bed plate, means operative when and only when said car is at a landing for generating a signal indicative of the rotational tendency of said bed plate, and means for storing said signal while said car is running.

13. A load weighing system, comprising, an elevator car, a counterweight, a bed plate positioned above said car and counterweight, a traction sheave mounted on said bed plate for rotation about a substantially horizontal axis, a secondary sheave rotatably mounted on said bed plate with its axis parallel to but laterally displaced from said axis of said traction sheave, a hoist rope passing over and engaging both of said sheaves and including first and second portions constituting first and second rope drops having the ends thereof fastened to said car and said counterweight respectively, a compensating rope depending from and interconnecting said car and said counterweight, a motor operatively connected to said traction sheave for raising and lowering said car, a pair of blocks of polyurethane material, constituting a pivot, aligned with each other parallel to said axes of said sheaves and interposed between the building structure and said bed plate, the line joining the centers of said blocks being located substantially midway between said first and second rope drops, whereby the moments tending to rotate said bed plate are independent of the position of said car but vary with the load in said car, a magnetostrictive transducer for generating a signal indicative of the rotational tendency of said bed plate, means for rendering said transducer operative when and only when said car is at a landing, and means for storing said signal while said car is running.

14. A load weighing system, comprising, an elevator car, a counterweight, a bed plate, sheave means rotatably mounted on said bed plate, a hoist rope passing over and engaging said sheave means and having opposite ends fastened to said car and said counterweight, means for mounting said bed plate for limited rotation, whereby variations of the load in said car vary the tendency of said bed plate to rotate, a rod exhibiting magnetostrictive properties having opposite ends fastened to said bed plate and the building structure for resisting the tendency of said bed plate to rotate, said rod being fastened to be stressed in tension as said bed plate tends to rotate, and means for generating a signal indicative of the stress in said rod.

15. A load weighing system, comprising, an elevator car, a counterweight, a bed plate, sheave means rotatably mounted on said bed plate, a hoist rope passing over and engaging said sheave means and having opposite ends fastened to said car and said counterweight, means for mounting said bed plate for limited rotation, whereby variations of the load in said car vary the tendency of said bed plate to rotate, and a transducer including a rod exhibiting magnetostrictive properties for generating a signal indicative of the rotational tendency of said bed plate, said rod having opposite ends fastened to said bed plate and the building structure so as to be stressed in tension as it resists rotation of said bed plate.

16. A load weighing system, comprising, an elevator car, a counterweight, a bed plate positioned above said car and counterweight, a traction sheave rotatably mounted on a horizontal axis on said bed plate, a secondary sheave rotatably mounted on said bed plate with its axis parallel to but laterally displaced from the axis of said traction sheave, hoist ropes passing around said sheaves in a double wrap and having opposite ends fastened to said car and said counterweight, a motor operatively connected to said traction sheave for raising and lowering said car, a pivotal mounting for said bed plate comprising a pair of slabs of polyurethane aligned with each other parallel to said axes of said sheaves midway between the vertical portions of said hoist ropes which support said car and said counterweight and interposed between said bed plate and the building structure, whereby said bed plate can rotate slightly about said slabs as a pivot axis as the load in said car varies, and whereby the moments tending to rotate said bed plate are independent of the position of said car, compensating ropes depending from and interconnecting said car and said counterweight, a first nickel rod exhibiting magnetostrictive properties having its upper end fastened to the building structure and its lower end fastened to said bed plate at a position laterally displaced to that side of the portion of said hoist ropes supporting said car which is remote from said pivotal mounting, whereby said rod is subjected to tension which limits the rotational movement of said bed plate and whereby an increase of the load in said car increases the tension in said rod, a second unstressed nickel rod, a first transformer having primary and secondary windings and the core of which includes a portion of said first rod, a second transformer having primary and secondary windings and the core of which includes a portion of said second rod, said primary windings being connected in series to a source of alternating current, said secondary windings being connected in series opposition to a first pair of conductors, whereby the voltage across said conductors increases as the load in said car increases, a rectifier having its input connected to said first pair of conductors and its output connected to a second pair of conductors for deriving a unidirectional voltage indicative of the load in said car, and means for generating a plurality of signals each indicative of the presence on said second pair of conductors of a different predetermined voltage magnitude.

17. Apparatus according to claim 16 further comprising means for rendering said last named means operative when and only when said car is at a landing.

18. Apparatus according to claim 17 in which said means for generating signals includes means for storing said signals while said car is running.

19. Apparatus according to claim 16 in which said means for generating signals comprises a plurality of controlled rectifiers, a like plurality of relays each energized when a different one of said rectifiers is conductive, and means for rendering each of said rectifiers conductive at a different predetermined magnitude of said unidirectional voltage.

20. Apparatus according to claim 19 further comprising means responsive to the departure of said car from a landing for disconnecting said transformers from said source and for maintaining energized those and only those relays which have been energized by conduction of said controlled rectifiers.

References Cited
UNITED STATES PATENTS

| | | | |
|---|---|---|---|
| 1,490,271 | 4/1924 | Hecht | 187—1 |
| 1,753,753 | 4/1930 | Ruggles | 177—132 X |
| 2,411,023 | 11/1946 | Bruns | 177—132 |

RICHARD B. WILKINSON, *Primary Examiner.*

G. H. MILLER JR., *Assistant Examiner.*